C. E. BRADLEY AND J. G. COFFIN.
PROCESS AND APPARATUS FOR TREATING LATEX.
APPLICATION FILED DEC. 7, 1921.
1,428,526. Patented Sept. 12, 1922.
4 SHEETS—SHEET 1.
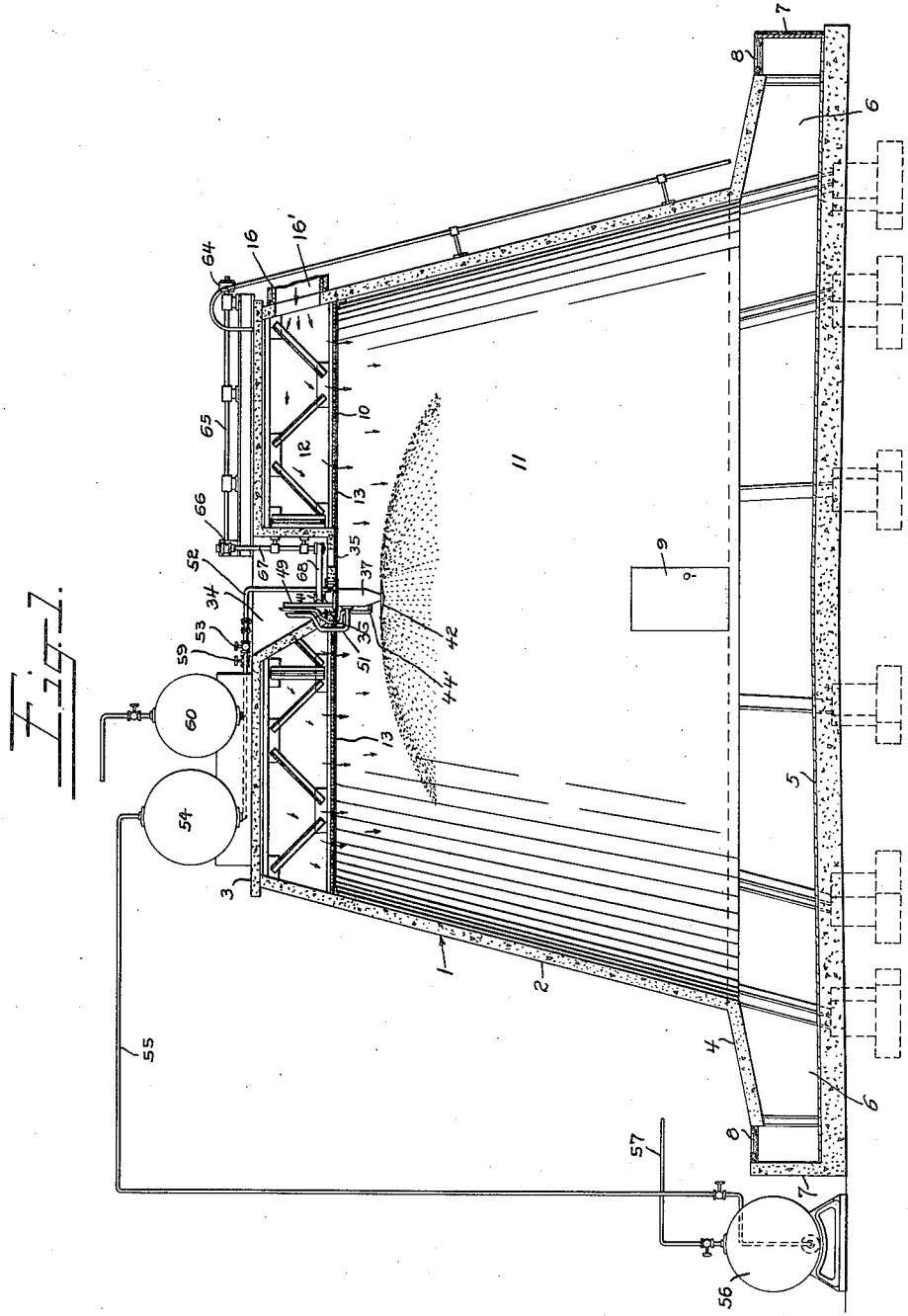
Inventors
CHARLES E. BRADLEY &
JOSEPH G. COFFIN
By their Attorney
Ernest Hopkinson

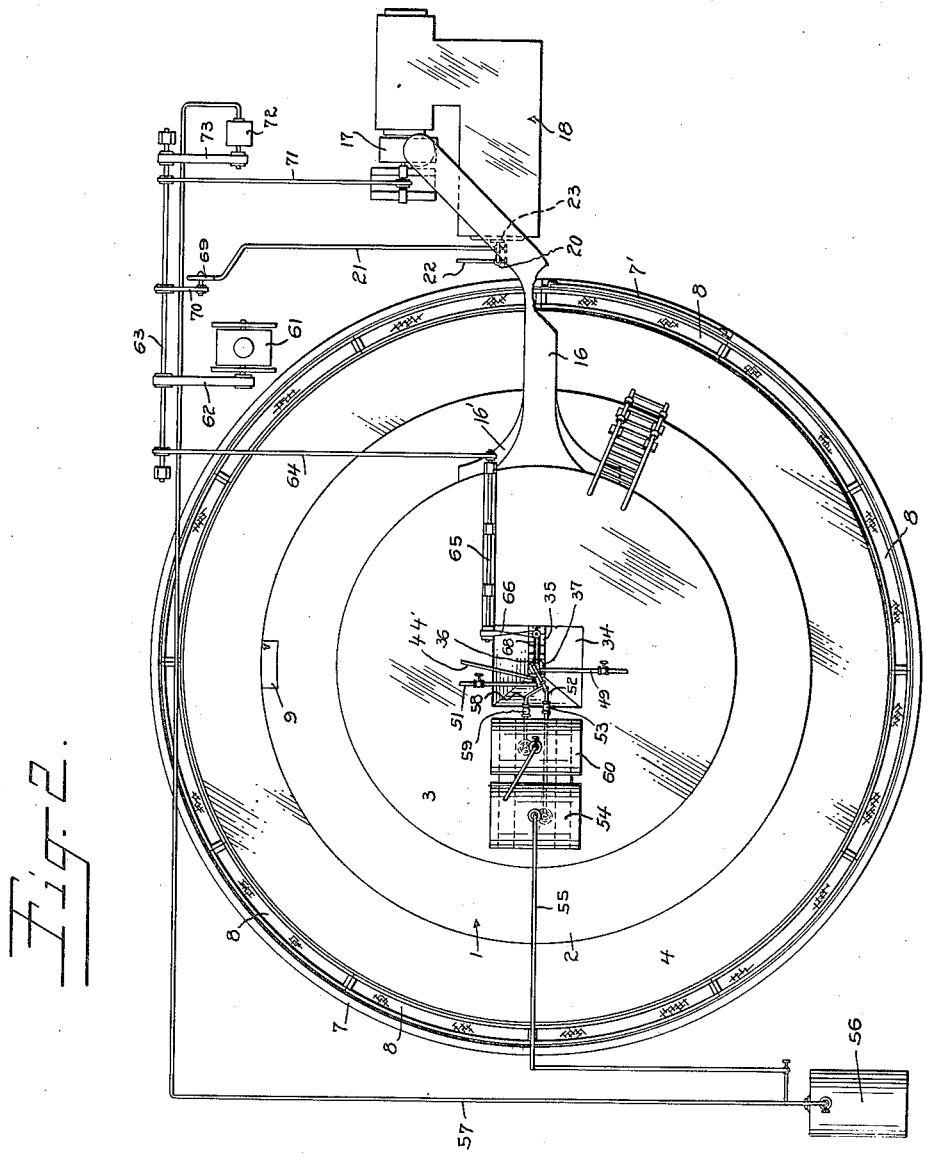

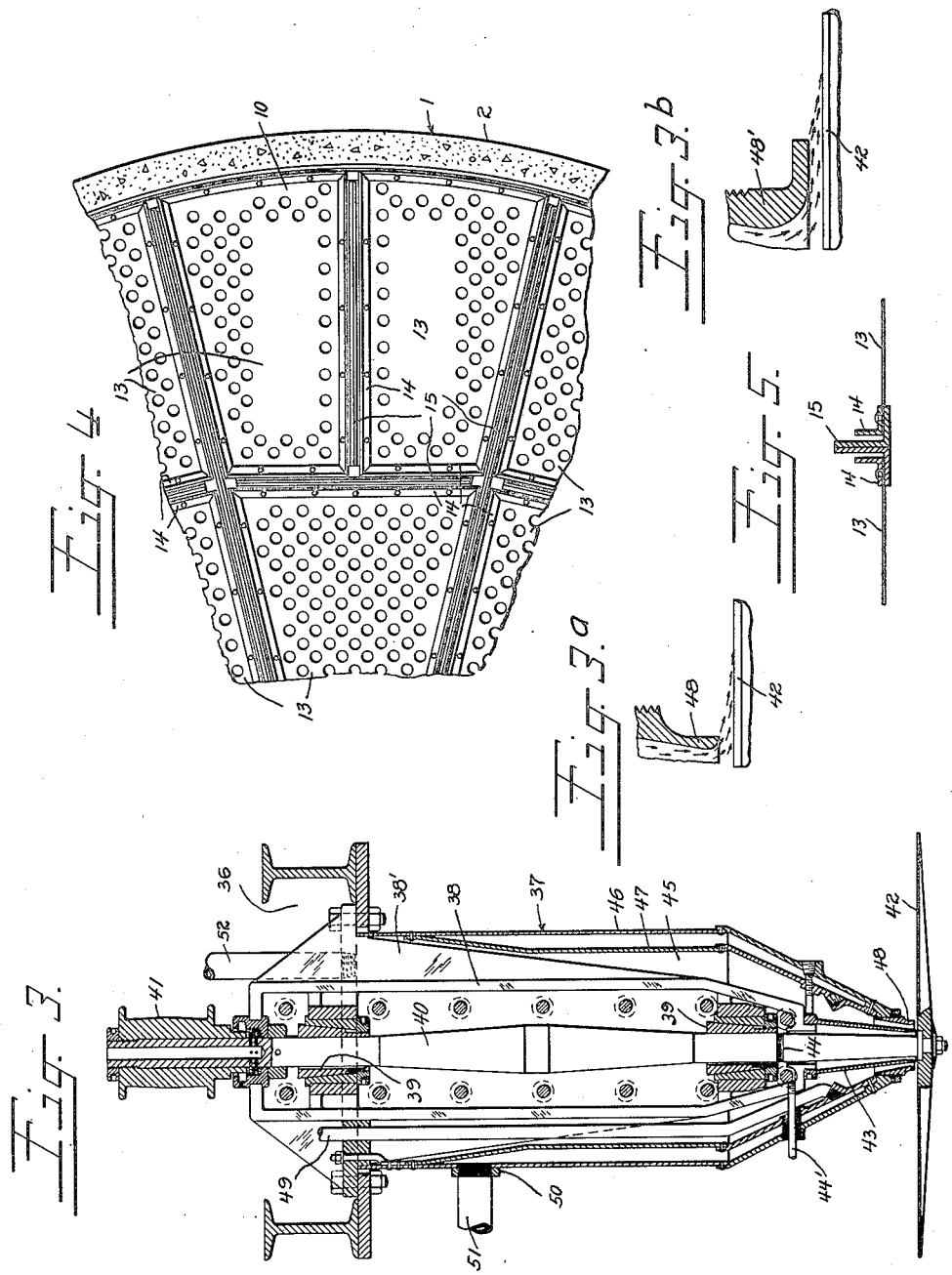

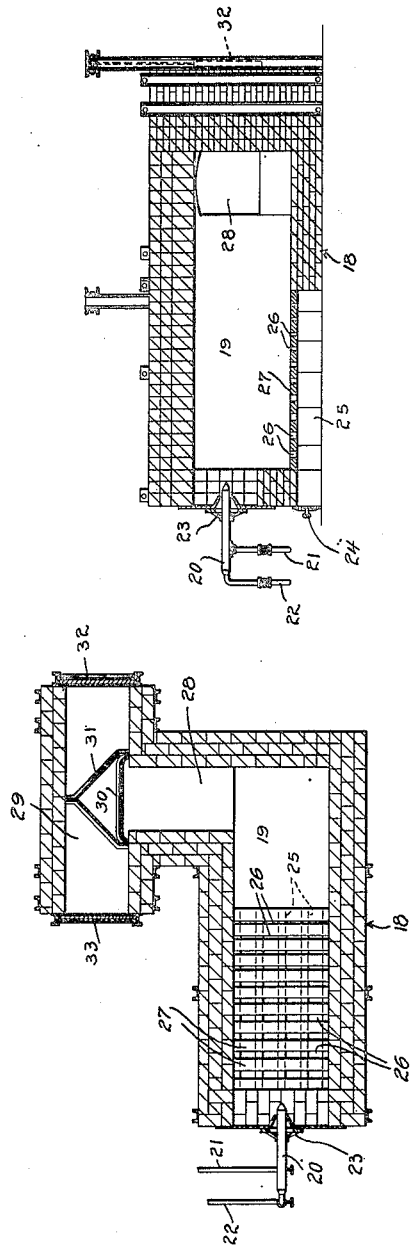

Patented Sept. 12, 1922.

1,428,526

UNITED STATES PATENT OFFICE.

CHARLES E. BRADLEY, OF MONTCLAIR, NEW JERSEY, AND JOSEPH G. COFFIN, OF HEMPSTEAD, NEW YORK, ASSIGNORS TO GENERAL RUBBER COMPANY, A CORPORATION OF NEW JERSEY.

PROCESS AND APPARATUS FOR TREATING LATEX.

Application filed December 7, 1921. Serial No. 520,505.

*To all whom it may concern:*

Be it known that we, CHARLES E. BRADLEY and JOSEPH G. COFFIN, both citizens of the United States, and residing in Montclair, county of Essex, State of New Jersey, and Hemstead, L. I., county of Nassau, State of New York, respectively, have invented certain new and useful Improvements in Processes and Apparatus for Treating Latex, of which the following is a full, clear, and exact description.

This invention relates to a process and apparatus for treating latex and similar material, more particularly to a process and apparatus for drying the same in the form of comminuted particles, which may by a subsequent treatment be united to form crude rubber or rubber compounds. This application is a continuation in part of our co-pending application, Serial No. 490,176, filed August 5, 1921.

An object of our invention is to provide an improved process and apparatus for spraying and drying rubber latex or similar material.

Another object is to provide a process and apparatus for drying latex by which the physical characteristics of the resultant rubber can be readily varied.

Still another object is to provide a process and apparatus by which the latex may be sprayed in particles of relatively uniform size and uniformly distributed in a drying medium.

Still another object is to provide a process and apparatus for spraying latex by which the formation of extremely small dustlike particles will be avoided.

A further object is to provide a process and apparatus the product of which will be comparatively easy to mill, and possess a high tensile strength, elasticity, and resistance to ageing.

A still further object is to provide an apparatus for drying latex in which the deposition of the dried latex will be confined to the surface or surfaces designed to receive them.

Still another object is to provide an apparatus economical in the use of the drying medium, and in which the latter will be economically produced.

The invention consists broadly in uniformly distributing the latex or similar material, by the aid of a moving surface, in the form of relatively uniform size particles in a moving current of a drying medium, and also in the apparatus used.

For a detailed disclosure of the invention reference is had to the accompanying specification and drawings, in which latter:

Fig. 1 represents in vertical section an apparatus for carrying out our process.

Fig. 2 is a plan view thereof.

Fig. 3 is a vertical section of the spraying element.

Fig. 3$^a$ is an enlarged detail illustrating the latex discharge nozzle.

Fig. 3$^b$ is a similar view but showing the horn shaped end of the nozzle as more widely extended laterally.

Fig. 4 is an enlarged broken away detail of the removable perforated plates for distributing the drying medium.

Fig. 5 is a section showing the manner of supporting the plates.

Fig. 6 is a horizontal section of a furnace for supplying a heated drying medium; and Fig. 7 is a vertical longitudinal section through the furnace proper.

Referring to Fig. 1 there is shown a heat insulated casing 1 having in the present instance a frusto-conical side wall 2 and top 3, the side wall being outwardly extended at its base, as shown at 4. The bottom wall 5 is spaced from the side wall and extension 4 to form with the latter an outlet passage 6. At the periphery of the bottom 5 is a vertical wall 7 which forms with the extension 4 an annular outlet which may be covered, if desired, with the removable perforated screens 8. The wall 7 may be provided with one or more removable gates 7', as shown in Figs. 1 and 2, and the side wall 2 is preferably provided with a door 9. A perforated partition wall 10 extends across the upper part of the casing 1, and divides the later into a drying chamber 11 and a supply chamber 12 for a heated gaseous medium. In Figs. 4 and 5 is disclosed one embodiment of the partition 10 in which a series of perforated plates 13 surrounded by frames 14 are removably disposed on the framework 15 extending across the casing 1. By providing a plurality of plates having different sized openings therein and of different arrangement, any desired distribution of the drying medium entering the chamber 11 may be secured, or instead the distribution may be varied by covering portions of the perforated plates 13 in any desired manner. A supply pipe 16 for the heated drying medium leads at one end into the chamber 12 through the enlarged opening 16', while at the other end the pipe 16 is connected to a suction device 17 in communication with the furnace 18.

The furnace 18 comprises an elongated combustion chamber 19 at one end of which is disposed an oil burner 20 of any suitable type, and having an air supply pipe 21 and oil pipe 22 connected thereto. Atmospheric air may be supplied around the burner at 23. Air for combustion is also supplied through the damper 24 adjacent the bottom of the furnace and passes inwardly through longitudinal passages formed by loosely placed fire brick 25 and thence upwardly through the transverse openings 26 formed by fire brick 27. At the opposite end of the furnace is an exhaust passage 28 which communicates with a mixing chamber 29, preferably at about the middle portion of the latter. A screen 30 is removably supported by the frame 31 in the mixing chamber 29 across the inlet of passage 28 thereto. The mixing chamber, which in the present instance is shown as a straight passage, is provided at one end with an inlet governed by the movable gate 32, and at the other end with an exhaust opening in communication with the suction device 17, which opening is governed by the gate 33.

The top wall 3 of the casing 1 is provided adjacent its center with a pit or depression 34 the bottom of which is disposed substantially on a level with the perforated partition 10. The bottom wall of the pit is provided with a glass covered peephole 35 through which the operations in the drying chamber 11 may be viewed, and at a point substantially centrally of the perforated partition 10 is provided with a second opening 36 in which is secured the sprayer 37. This sprayer comprises an elongated and enclosed supporting frame 38 which is provided with the strengthening ribs 38' to assist in maintaining the frame rigid. For ease in assemblage this frame is made in two parts bolted together. Adjacent its top and bottom the frame is provided with the bearings 39 in which is mounted a shaft 40 extending above and below the frame and carrying at its upper end a drive pulley 41 and at its lower end a tapered disk 42 having a smooth flat upper surface. A tapered tube 43 is secured to the lower end of the frame 38 and surrounds the extending portion of the shaft 40 between the frame 38 and disk 42. In order to prevent drip of oil from the bearings 39 on the disk 42, the shaft 40 may, if desired, be provided with the concentric ridges 44 which when the shaft is in movement will centrifugally project any oil drip into an annular cup in the bottom of the frame 38 from which it may be removed, as desired, by a pipe 44'. Surrounding the frame 38 and spaced from it to provide a latex chamber 45 is a cooling jacket formed by the outer wall 46 and inner wall 47. The lower portion of the cooling jacket is conically shaped and below the spaced portion of its walls a nozzle 48 is adjustably secured in the jacket. It will be seen that this nozzle in conjunction with the tapered tube 43 forms a discharge outlet for the latex chamber 45 and that by adjusting the nozzle 48 toward or from the disk 42 the thickness of the film of latex discharged on the disk may be varied as desired. A supply pipe 49 for the cooling agent, which may be water, passes through the top of the sprayer and downwardly through the latex chamber where it is tapped into the lower conical portion of the cooling jacket, and adjacent the top of the outer wall 46 an exhaust outlet 50 for the cooling agent is provided in which may be secured the pipe 51, as shown in Fig. 1. A latex supply pipe 52 governed by a valve 53 (Fig. 1), is connected at one end to the top of the latex chamber 45 and at its other end to an auxiliary latex reservoir 54 disposed on the top of casing 1. A valved supply pipe 55 for the tank 54 leads from the bottom of a main tank 56 disposed in any suitable position adjacent the apparatus. The latex is forced from the tank 56 to the tank 54 by means of fluid under pressure, such as air supplied to the top of the tank 56 by a valve controlled pipe 57. A water supply pipe 58 is tapped into the latex pipe 52 between the control valve 53 and the sprayer 37. This water pipe is provided with a valve 59 and leads from a water tank 60 disposed on the top 3.

Any suitable means may be provided for rotating the sprayer, such as an electric or turbine drive, but as it is contemplated installing the apparatus shown in localities isolated from the usual sources of supply, it is preferred to install a power plant of the greatest simplicity and ease of repair by unskilled mechanics, and at the same time requiring a minimum of materials for its operation. We therefore prefer to provide a fuel oil engine 61, which by means of the belt 62 drives a main shaft 63. This latter by the belt 64 is connected to a shaft 65 on the top of casing 1, which latter shaft by means of belt 66 drives a vertical shaft 67 connected by a belt 68 to the drive pulley 41 of the sprayer. A small blower 69 driven by a belt 70 from the shaft 63 is connected to the pipe 21 for furnishing air to the oil burner 20. The exhaust fan 17 is driven by a belt 71 from shaft 63. An air compressor 72 is also driven by a belt 73 from the shaft 63 and this compressor is connected to the valve controlled pipe 57 for applying air pressure to the latex in tank 56.

In carrying out the process the oil burner 20 in the furnace 18 is started and by means of the damper 24 regulated quantities of air for complete combustion are provided, and the heated combustion products pass out of the combustion chamber 19 through the passage 28 and into the mixing chamber 29. At the beginning the gate 33 is closed and the gate 32 opened, allowing the combustion products to exhaust into the open air until such time as the furnace has been properly heated up. The gate 33 is then opened and the exhaust fan 17 started, thereby causing an influx of atmospheric air into the mixing chamber through the gate 32, which air is mixed with the combustion products in the chamber 29 and in the fan housing, and delivered by the pipe 16 into the supply chamber 12 in casing 1. By a proper regulation of the burner 20, the damper 24, and the gate 32, any desired admixture of combustion products and air may be obtained, and the temperature of the mixture properly regulated. The mixture then passes downwardly through the perforations in the partition 10 into the drying chamber 11, and the valve 59 is opened to admit a supply of water from the tank 60 to the sprayer disk 42. When ready the water valve 59 is gradually closed and the valve 53 in the latex supply pipe is gradually opened, until finally the supply of water is entirely shut off and latex alone is being supplied to the sprayer disk 42. If latex were supplied at the beginning to the disk 42 heated by the incoming drying medium the latex would tend to coagulate and burn on the sprayer disk, but by first admitting water only to the sprayer disk it is cooled sufficiently to permit the subsequent supply of latex without injury to the latter. In stopping the apparatus the above procedure is reversed. The sprayed latex particles by reason of the central position of the sprayer and their radial distribution, are evenly spread in the downwardly moving current of the drying gas and the dry particles are deposited on the floor 5. The drying medium upon reaching the bottom of the drying chamber passes horizontally outward through the passage 6, and any particles which have not already been deposited drop to the extended portion of the floor 5 below the extension 4. The drying gas in the present embodiment is then turned abruptly upward by the outer wall 7, and is exhausted through the opening between the wall and the extension 4. The screens 8 shown disposed in this opening are removable, and may be dispensed with if desired. The dry latex particles may be removed by shoveling or by scraping through the gate 7', or by any suitable automatic means, and may then be compacted or given any desired subsequent treatment.

By the use of the disk sprayer the formation of excessively large or extremely small dust-like particles is avoided, and the particles are evenly distributed. The dust-like particles when formed are relatively difficult to recover and ordinarily require special apparatus for this purpose. It is desirable to project the drying medium into the chamber 11 in the same direction as the particles of latex are falling for the reason that the drying gases when at their highest temperature, which is preferably above 240° F., impinge on the latex particles when the latter contain their greatest percentage of moisture, thereby preventing any injury to the rubber by burning or overheating, since, due to evaporation, the latex particles at this time are kept at a temperature not above 212° F. As the dried particles approach the floor 5 and are deposited thereon, the temperature of the drying gases has been so much reduced that there is no danger of overheating the particles at this time. By making the drying chamber of gradually increasing cross-sectional area from its top to the bottom, the tendency of the particles to deposit on the side wall 2 is avoided, and in addition the speed of the drying gases, which is preferably not over 16 or 18 feet per minute, when first entering the drying chamber, is still further reduced by expansion. By using a slowly moving and evenly distributed current of the drying gases, in a chamber free from any projections or recesses, eddy currents are prevented to a great extent, with avoidance of deposition of the particles on any other surface than the surface on which they are intended to collect. The passage 6 in practice may be extended outwardly a sufficient distance to insure the deposition of all latex particles not deposited on that portion of the floor 5 below the chamber 11. In case the apparatus is used in the outer air it may be desirable to provide some means for preventing back draft at the outlet of the passage 6, and for protecting the mechanism disposed on the top 3. While in the present instance the collecting chamber has been shown as circular in outline, other forms, such as polygonal, may be used. By the provision of the cooling jacket for the sprayer any heating of the latex in its passage to the spraying disk is avoided. The spraying disk is preferably made flat, smooth and unobstructed on its upper surface, and may be made of any non-corrosive steel alloy or of nickel plated steel. By adjusting the nozzle 48 toward or from the disk the quantity of latex discharged may be regulated as desired. As the latex spreads on the revolving disk it acquires a high radial velocity, as well as a high circumferential velocity, and as it reaches the edge of the disk has a resultant velocity of about 1.4 times the rim speed of the disk. A rim speed of about 300 miles per hour has been found to be suitable for the disk. During use the operation of the spraying disk and conditions within the drying chamber may be viewed through the peep-hole 35. Due to the relative movement between the sprayer disk and the nozzle 48 any tendency of the outlet to become clogged is avoided. By reason of the curved or horn shape of the inner wall of the nozzle 48 the direction of flow of the latex is changed very gradually and it flows out between the nozzle and disc without any disturbance such as would tend to cause uneven distribution. The horizontal length of the passage between the horn shaped end of the nozzle and the disc may be varied to suit conditions, as shown in Figs. 3$^a$ and 3$^b$, from about $\frac{1}{32}$ inch to $\frac{3}{4}$ inch.

It will be noted that in the mixing chamber of the furnace 18 the screen 30 for removing any sparks and impurities in the combustion products is disposed in such a position that it is exposed to the cool air entering the mixing chamber at the gate 32, thereby lengthening the life of the screen by preventing it from becoming overheated. The fire brick 25 and 27, through which the air from damper 24 is introduced to the furnace, is loosely built up and its arrangement may therefor be changed to suit conditions. As the air in the drying medium is directly heated and the operations in the furnace are conducted under reduced pressure, by reason of the suction fan 17, there are substantially no heat losses in the preparation of the drying medium. Moreover, the coagulating effect of the combustion products is added in the drying process, and the addition of the combustion products to the air reduces the oxygen content present in the drying medium and thereby its oxidizing effect on the rubber. While it is obvious that either solid liquid or gaseous fuel may be used, it is preferred to use ordinary fuel oil, which can be obtained almost anywhere, and which is also used in the oil engine 61 of the power plant. It is obvious that gearing may be substituted for the belt drive shown for the sprayer, and that the sprayer may be either electrically or turbine driven if desired, but as before stated, the mechanism shown is simple, easily repaired, and obviates the use of steam boilers or electrical equipment.

Compounding ingredients, or vulcanizing agents, or both, may be added to the latex prior to the drying treatment or subsequently thereto, as desired.

By varying the temperature, amount and distribution of the drying medium, and the size of the spraying disk, its speed rotation and the flow of latex, the process may be regulated within wide limits to provide products of varying physical characteristics. For example, the particles may be relatively large, dry on the surface and wet in the center, or they may be large and completely dry, or they may be small and partially dry, or any other desired combination may be effected. However, owing to the use of the disk spray the size of the particles is kept extremely uniform under any given condition as compared with the particles obtained by compressed air or pressure spray, and the formation of particles smaller than 10 mu has been almost completely prevented.

The following represent the results of physical and chemical tests made upon rubber obtained in accordance with the invention:

| Moisture. | Water extract. | Ash. |
|---|---|---|
| 0.9% | 7.7% | 1.2% |

Rubber vulcanized with 10% sulphur:

| Green tensile. | Stretch. |
|---|---|
| 3900 lb. per sq. in. | 9.7 |

Aged 3 hrs. at 235° F. in air:

| Tensile. | Stretch. |
|---|---|
| 3200 | 9.2 |

The particles obtained by this method when viewed under the microscope reveal themselves as transparent spheres of rubber ranging in size from about 15 to 150 mu. The material as collected from the bottom of the chamber 11 is extremely porous and for this reason the material when it contains moisture may be readily dried.

It will be seen from the above table that the tensile strength of the rubber is high, and its ageing properties good.

The process is simple and efficient, and is relatively inexpensive as compared with the air spray process spraying by compressed air, through elimination of the cost of compressing air for the sprayers and through the saving in heat necessary for raising the temperature of the compressed air upon expansion, and also through the prevention of any heat losses by direct heating of the air.

As many widely different embodiments of this invention may be made without departing from the spirit thereof, it will be understood that we do not intend to limit ourselves to the specific embodiment herein set forth except as indicated in the appended claims.

Having thus described our invention, what we claim and desire to protect by Letters Patent is:

1. In a process for treating latex or similar material, feeding latex onto a moving surface, discharging the latex from the surface as a series of particles, and withdrawing moisture from the particles.

2. In a process for treating latex or similar material, feeding latex to a surface rotating at high speed, discharging the latex from the surface as a stream of particles, and drying the particles.

3. In a process for treating latex or similar material, feeding latex onto a moving surface, discharging the latex from the surface as a series of particles having a substantially uniform size, and drying the particles.

4. In a process for treating latex or similar material, feeding latex on to a moving surface, discharging the latex from the surface as a series of particles, subjecting the particles to a drying medium, and drying the particles.

5. In a process for treating latex or similar material, feeding latex onto a moving surface, discharging the latex from the moving surface as a series of substantially uniform particles, and having a range in diameter from a unit to approximately ten times the unit, and drying the particles.

6. In a process for treating latex or similar material, feeding latex onto a rotating surface, discharging it from the surface as a series of particles, bringing the particles into contact with a drying medium, and drying the particles.

7. In a process for treating latex or similar material, feeding latex onto the surface of a rotating disc, discharging it from the edge of the disc as a series of particles, bringing a heater gas into contact with the particles, and drying the particles.

8. In a process for treating latex or similar material, feeding latex onto the surface of a rotating disc, discharging the latex from the edge of the disc as a series of substantially uniformly sized particles, bringing a drying medium into contact with the particles, and drying the particles.

9. In a process for treating latex or similar material, feeding latex onto the surface of a disc rotating at high speed, discharging it from the edge of the disc as a stream of particles, bringing a heated drying gas into contact with the stream of particles, and drying the particles.

10. In a process for treating latex or similar material, feeding latex onto the surface of a disc rotating at a rim speed of approximately 300 miles per hour, discharging the latex from the rim of the disc as a series of particles, and drying the particles.

11. In a process for treating latex or similar material, feeding latex onto the surface of a disc rotating at a rim speed of approximately 300 miles per hour, discharging latex from the edge of the disc as a stream of particles, in the form of a curtain, ranging in size from a unit diameter to approximately ten times the unit diameter, bringing a heater current of air into contact with the stream of the particles, and drying the particles.

12. A process for treating latex or similar material comprising discharging the latex radially in the form of uniformly fine particles into a slowly moving current of a heated gaseous medium.

13. A process for treating latex or similar material comprising discharging the latex radially and horizontally in the form of uniformly fine particles into a slowly and downwardly moving current of a heated gaseous medium.

14. A process for treating latex or similar material comprising uniformly distributing latex in the form of relatively uniform sized small particles transversely across a slowly and downwardly moving expanding current of a heated gaseous medium.

15. A process for treating latex or similar material comprising dividing the latex into particles varying in size within relatively small limits, and individually drying the particles while under suspension in a downwardly moving current of heated air and combustion products.

16. An apparatus for drying latex or similar material comprising a drying chamber, means at the top thereof for variably distributing a current of a heated gaseous medium downwardly in said chamber, means disposed axially of the chamber adjacent the top for distributing finely divided particles of latex transversely of said current, and an exhaust opening adjacent the opposite end of the chamber.

17. An apparatus for drying latex or similar material comprising a drying chamber, means for downwardly discharging a uniformly distributed volume of a heated gaseous medium through the top thereof, a disc sprayer disposed below said top and centrally thereof, means for at will supplying latex or water to said sprayer, and an exhaust opening adjacent the bottom of the chamber.

18. An apparatus for drying latex or similar material comprising a drying chamber of greater cross sectional area at its bottom than at its top, means disposed axially of the chamber adjacent its top for radially discharging latex in the form of uniform sized small particles, means for discharging a heated gaseous medium into the chamber through its top, and an annular exhaust opening adjacent the bottom of the chamber.

19. An apparatus for drying latex or similar material comprising a circular drying chamber of greater cross sectional area at its bottom than at its top and having imperforate side walls, means disposed adjacent the top and axially thereof for radially discharging latex in the form of uniform sized small particles, means for discharging a widely distributed volume of a heated gaseous medium downwardly on the particles, and means adjacent the bottom of the chamber for discharging the gaseous medium therefrom.

20. An apparatus for drying latex or similar material comprising a frusto-conical drying chamber having a bottom wall spaced from the side wall to provide an outlet, an outer concentric wall spaced from said outlet, a wall partly covering the space enclosed by said outer wall to provide an exhaust opening, means for supplying a heated gaseous medium to the upper part of the chamber, and means in the upper part of the chamber for uniformly distributing finely divided particles of latex.

21. An apparatus for drying latex or similar material comprising a frusto-conical chamber, a perforated partition extending across the upper part thereof, means for supplying a heated gaseous medium to the space above the partition, a heat insulated latex reservoir disposed below the partition and having a discharge opening at its lower end, a shaft extending through said opening and having a spraying disc secured thereto adjacent said opening, means for rotating said shaft, and an exhaust opening adjacent the bottom of the chamber.

22. An apparatus for drying latex or similar material comprising a frusto-conical chamber having a bottom wall spaced from the side wall to provide an outlet, a wall concentric with the chamber wall and spaced outwardly therefrom, a wall partly covering the space between said chamber wall and concentric wall, a perforated partition in the upper part of said chamber, means for supplying a heated gaseous medium above said partition, and means disposed below the partition for uniformly distributing finely divided particles of latex.

23. An apparatus for drying latex or similar material comprising a drying chamber, a chamber disposed thereabove, removable perforated means separating said chambers, means for supplying a heated gaseous medium to said second chamber, means in said first chamber for distributing finely divided latex particles in the gaseous medium entering the same, and an exhaust opening leading from said first chamber.

24. An apparatus for drying latex or similar material comprising a drying chamber, means for discharging a relatively slowly moving current of a heated gaseous medium thereinto and longitudinally thereof, means disposed axially of the chamber adjacent the inlet for said medium for uniformly distributing uniform sized small particles of latex transversely of said current, a collecting surface for the dried particles, means adjacent said surface for abruptly changing the direction of said medium, and an exhaust opening for said medium.

25. An apparatus for drying latex or similar material comprising a circular drying chamber, a supply chamber for a heated gaseous medium above the drying chamber, inlets from the supply chamber to the drying chamber, means for feeding a regulated mixture of combustion products and air to the supply chamber, a rotatable disc sprayer disposed in the upper part of the drying chamber, and an upwardly opening exhaust outlet leading from adjacent the bottom of the drying chamber.

26. An apparatus for drying latex or similar material comprising a circular drying chamber, means for discharging a regulable mixture of combustion products and air downwardly into said chamber, an exhaust outlet adjacent the bottom of the chamber, a centrally disposed disc sprayer adjacent the top of the chamber, a latex reservoir above said disc and having an opening spaced from the upper surface of the disc, and means for varying said spacing.

27. An apparatus for drying latex or similar material comprising a circular drying chamber, a rotatable spraying disc disposed in the upper part of said chamber, means for discharging latex in a relatively thin film centrally of said disc, means for varying the thickness of the discharged film, and means for discharging a relatively large volume of a heated gaseous medium on the sprayed latex.

28. An apparatus for drying latex or similar material comprising a drying chamber having top and bottom walls, means for supplying a heated gaseous medium to the chamber through its top wall, an exhaust opening adjacent the bottom wall, a shaft extending through the top wall into the chamber and having a spraying disc secured thereto, means for rotating the shaft, a latex reservoir surrounding said shaft and having an opening in its bottom adjacent the upper surface of said disc, and means for varying the distance of said opening from the disc.

29. An apparatus for drying latex or similar material comprising a drying chamber having top and bottom walls, means for supplying a heated gaseous medium to the chamber through its top wall, an exhaust opening adjacent the bottom wall, a shaft extending through the top wall into the chamber and having a spraying disc secured thereto, means for rotating the shaft, latex supply means having an outlet surrounding said shaft and spaced from the upper surface of said disc, and means for varying the distance of said outlet from the disc.

30. An apparatus for drying latex or similar material comprising a chamber having a partition across its upper end, said partition including a series of removable perforated plates, means for supplying a heated gaseous medium above said partition, means for radially distributing finely divided particles of latex in the chamber adjacent said partition, and means for discharging the gaseous medium from the drying chamber after action upon the latex particles.

31. An apparatus for drying latex or similar material comprising a circular wall forming a drying chamber, means at its top for introducing a downwardly directed current of a heated gaseous medium, means adjacent the top for uniformly distributing latex in the form of finely divided particles in said gaseous medium, a bottom wall spaced from the side wall of the chamber and extending beyond the side wall to thereby form an enlarged latex collecting surface, and walls cooperating with the portion of the bottom wall extending beyond the circular wall to provide an exhaust outlet.

32. An apparatus for drying latex or similar material comprising a drying chamber having a circular side wall of increasing diameter from its top to its base and having its base portion merged into an outward extension, a bottom wall spaced from said side wall and extension to provide an enlarged latex collecting surface, an exhaust opening leading from the space formed by said extension and bottom wall, means adjacent the top of the chamber for supplying a heated gaseous medium thereto, and means for uniformly distributing finely divided particles of latex in said medium.

Signed at New York, New York, this first day of December, 1921.

CHARLES E. BRADLEY.

Signed at New York, New York, this twenty-ninth day of November, 1921.

JOSEPH G. COFFIN.